BAND PASS COUPLING CIRCUIT

Filed Dec. 27, 1951

INVENTOR.
GEORGE D. HULST
BY Darby & Darby
ATTORNEYS

United States Patent Office 2,729,796

Patented Jan. 3, 1956

2,729,796

BAND PASS COUPLING CIRCUIT

George D. Hulst, Upper Montclair, N. J., assignor to Allen B. Du Mont Laboratories, Inc., Clifton, N. J., a corporation of Delaware Application December 27, 1951, Serial No. 263,565

3 Claims. (Cl. 333—78)

This invention relates to coupling circuits for radio frequency energies, and more particularly to coupling circuits which selectively pass a band of radio frequencies.

An object of the invention is to provide a radio frequency coupling circuit which incorporates means for conveniently and precisely adjusting the frequency band pass characteristics thereof.

Another object is to provide a coupling circuit in which the tuning and bandwidth characteristics may be independently adjusted.

Other objects will be apparent.

In the drawing, Figure 1 is a perspective view illustrating the mechanical construction of a preferred embodiment of the invention.

In certain applications, such as in intermediate frequency amplifiers in radio, radar, and TV receivers, it is desirable to selectively transmit a fixed bandwidth of frequencies through an intermediate amplifier. The selective bandwidth is usually obtained by means of transformers or coupling circuits which are tuned to the desired center frequency and which transmit or pass a group of frequencies in the vicinity of this center frequency. For best results in such circuits, the coupling transformer must be capable of precise alignment or adjustment. Precise adjustment is particularly desirable when such transformers are used in stagger-tuned television intermediate frequency amplifiers, wherein several stages of transformer-coupled amplifiers are utilized, each transformer being tuned to a different center frequency so that the overall bandwidth of the combined stages is greater than the bandwidth of any individual stage. The novel coupling circuit herein described is provided with adjustment means which achieve the above mentioned results.

Figure 1:
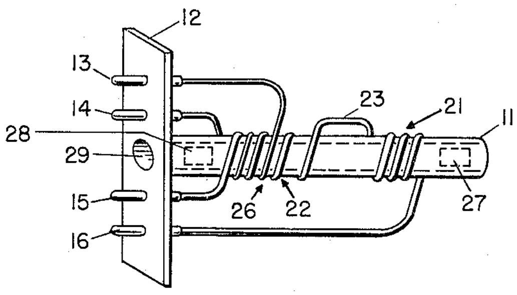
Figure 2:
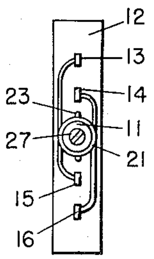
Figure 2 is an end view of the device of Figure 1, viewed from the right.

In Figures 1 and 2, an insulative form 11 is attached to a mounting base 12 through which extend terminal lugs 13, 14, 15 and 16. A primary winding is positioned on the form 11, and comprises two sections; a first section 21 positioned near one end of the form 11 and a second section 22 positioned near the other end of the form 11 and spaced from the first section 21. The two primary sections 21 and 22 are electrically series-connected together by a strap 23 which, in the preferred embodiment, comprises the wire of the windings. The remaining end of the first section 21 is connected to the lug 16; the remaining end of the second section 22 is connected to the lug 15. A secondary winding 26 is interwound with the second primary section 22; the ends of the secondary winding 26 are connected to the terminal lugs 13 and 14. A bandwidth adjustment slug 27 is positioned to be moved with respect to the first section 21 of the primary winding in order to affect the inductance thereof. The bandwidth slug 27 is preferably made of powdered iron and threaded within the form 11. Alternatively, other means may be employed for varying the inductance of the section 21. A center frequency tuning slug 28 is positioned to be moved with respect to the second portion 22 of the primary and the secondary 26. The tuning slug 28 is preferably made of powdered iron and threaded internally within the form 11. An opening 29 is provided in the base 12, through which an adjustment tool may be temporarily inserted to adjust the position of the slug 28. Likewise, the slug 27 is adjustable at the other end of the form 11.

Figure 3:
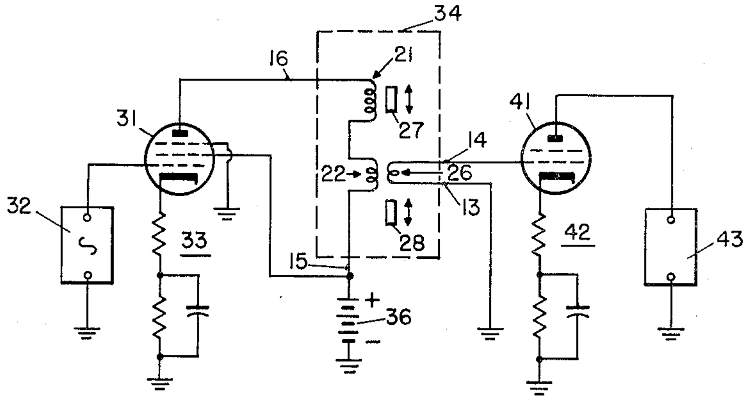
Figure 3 is an electrical schematic wiring diagram of a circuit which utilizes the invention.

Referring to Figure 3, an amplifier tube 31 has an input electrode connected to a signal source 32 which may provide television signals or the like. The cathode of the tube 31 is connected to a self-biasing network 33. The novel transformer, shown within dotted enclosure 34, has an end of the first section 21 of the primary winding connected to an output electrode of the tube 31 and is resonant with the inherent output capacitance thereof; the remaining end of the primary winding is connected to a terminal of a source 36 of voltage, the remaining terminal of which is grounded. One end of the secondary 26 is grounded and the remaining end thereof is connected to an input electrode of a second amplifier tube 41, the cathode of which is grounded through a biasing network 42. The input electrode of tube 41 has inherent capacitance and conductance with respect to ground, which are useful in the operation of the invention. Alternatively, other types of utilization devices may be connected to the secondary 26 instead of the tube 41.

An output electrode of the tube 41 is connected to a load or utilization circuit 43, which preferably comprises a transformer similar to that indicated by the numeral 34, this additional transformer being connected to additional amplifier stages. Several similar transformer-coupled stages may thus be connected in cascade. In a stagger-tuned circuit, the transformers are tuned to resonate at slightly different frequencies in order that the combined bandwidth of the amplifier may be greater than individual bandwidths of the individual stages.

Figure 4:
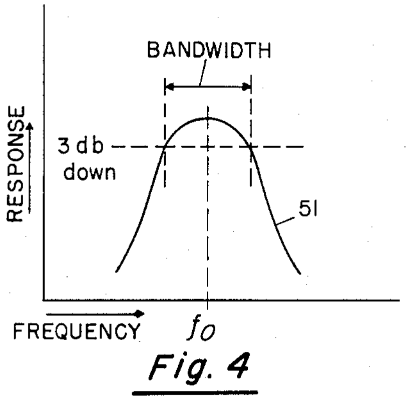
Figure 4 is a curve illustrating the relationship between bandwidth and center tuning frequency.

In Figure 4, a curve 51 represents a typical characteristic of gain of response vs. tuning frequency of a transformer. The bandwith, as shown, is approximately the width of the band of frequencies to which the transformer is responsive between the limits defined by the response points which are 3 db down from the peak response. The center frequency to which the transformer is tuned is designated by the symbol $f_0$.

Figure 5:
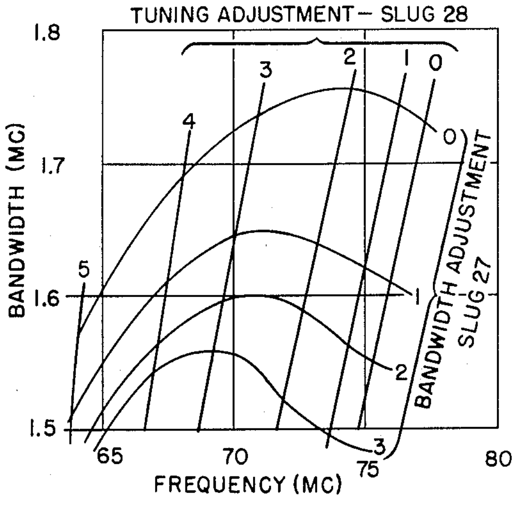
Figure 5 is a graph showing experimentally-determined effects of tuning adjustment and bandwidth adjustment of the novel coupling circuit.

The experimental curves of Figure 5 illustrate the adjustment of characteristics of the transformer in terms of bandwidth and tuning frequency as the positions of the two slugs are varied. As is shown by this graph, the tuning adjustment 28 affects the center tuning frequency and also has a relatively slight effect on the bandwidth. Adjustment of the bandwidth slug 27 affects the bandwidth and has a relatively slight effect on the tuning. The effect of the center tuning adjustment is shown in terms of turning the tuning slug 28 inwardly five turns from an arbitrary zero position. The bandwidth curves are shown for adjustment of the bandwidth slug 27 over a range of three turns inwardly starting from an arbitrary zero position. Although particular frequencies are shown in Figure 5, the invention is not limited to these frequencies; the invention may be used with many different frequencies and bandwidths.

The theory of operation of the invention is believed to be as follows:

The transformer is resistively and capacitively loaded by the grid conductance and capacitance of the tube 41.

When the bandwidth slug 27 is adjusted, the ratio of the impedance of the section 21 of the primary winding to the section 22 thereof becomes changed, so that the extent of the resistive loading of the secondary winding 26 upon the primary circuit changes. It is well known in the art that a change in resistive loading of a tuned circuit changes the bandwidth characteristic thereof.

The effect of the motion of the bandwidth adjustment slug 27 upon the center frequency tuning is small, for the following reason: As the slug 27 is moved toward and into the section 21 of the primary winding, it tends to increase the inductance of this section, thereby tending to lower the center frequency. At the same time, however, the section 22 of the primary winding becomes a smaller proportion of the total inductance, and the capacitance loading caused by the tube 41 becomes less tightly coupled to the primary circuit; this reduction in the circuit capacitance tends to raise the center frequency and thus opposes the first-mentioned effect. With a proper choice of circuit values, balance of center tuning can be attained over a range of bandwidth adjustment, although the usefulness of the invention is not limited to exact balance.

Adjustment of the center frequency tuning slug 28 affects the tuning of both the secondary winding 26 and the section 22 of the primary winding and thereby is able to shift the center frequency. As the slug 28 is moved toward and into the windings, the tuning frequency becomes lowered. At the same time, the usual tendency for the bandwidth to become more narrow is counteracted by an increased coupling between the primary and secondary windings, thereby increasing the loading and tending to widen the bandwidth. As shown in Figure 5, there is practically no change in bandwidth when the center frequency tuning is changed over a relatively wide range.

When the adjustment slugs 27 and 28 are moved away from their respective coils, it is preferable that this movement be in a direction toward the ends of the form 11, as is indicated in Figure 1, in order to minimize interaction effects which might occur if the slugs were moved inwardly toward one another. The sections of the primary winding need not be positioned on the same form; if desired, they may be supported independently. The desideratum is to isolate substantially the fields of the respective sections.

While a preferred embodiment of the invention has been shown and described, and preferred theories have been discussed, other embodiments, ramifications and theories will be apparent to those skilled in the art, and will fall within the scope of the present invention.

The true scope of the invention is defined by the following claims.

What is claimed is:

1. A device for coupling a voltage source having a pair of output terminals and capacitance thereacross to a utilization circuit having a pair of input terminals and input capacitance and conductance thereacross, said device comprising a tunable transformer having a primary circuit comprising first and second helical primary windings connected in series across said output terminals of said source; a helical secondary winding bifilarly interwound with said second primary winding and connected across said input terminals of said utilization circuit, said secondary winding being inductively coupled substantially exclusively to said second primary winding to reflect said input capacitance and conductance back to said second primary winding to load and to tune said primary circuit; a first slug located within said first primary winding and movable axially thereof to change the inductance of said first primary winding thereby changing the bandwidth of said device; and a second slug located within said second primary and said secondary and movable axially thereof to adjust the center frequency to which said device is tuned, the relative inductances of said first and second primary windings being so related that the change in the amount of said input capacitance reflected back to said primary circuit upon movement of said first slug maintains substantially constant the frequency to which said primary circuit is tuned upon variation of the inductance of said first primary winding upon said movement of said first slug.

2. The device of claim 1 in which said second primary winding and said secondary winding are so related that variations in the bandwidth due to movement of said second slug are counteracted by variations in the coupling between said second primary winding and said secondary winding due to said movement of said second slug.

3. The device of claim 1 in which said first primary winding and said bifilarly wound second primary winding and secondary winding are wound on a common hollow tubular form.

References Cited in the file of this patent

UNITED STATES PATENTS

| | | |
|---|---|---|
| 2,441,116 | Mackey | May 4, 1948 |
| 2,483,994 | Davis | Oct. 4, 1949 |
| 2,550,486 | Loughlin | Apr. 24, 1951 |
| 2,558,573 | Manke | June 26, 1951 |